(12) United States Patent
Miao et al.

(10) Patent No.: US 12,380,619 B2
(45) Date of Patent: Aug. 5, 2025

(54) LOSSLESS PRIVACY PRESERVING DATA ANONYMATION FOR ADAS/AD MODEL DEVELOPMENT

(71) Applicant: GM GLOBAL TECHNOLOGY OPERATIONS LLC, Detroit, MI (US)

(72) Inventors: Yun Qian Miao, Waterloo (CA); Alaa M. Khamis, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 241 days.

(21) Appl. No.: 18/328,170

(22) Filed: Jun. 2, 2023

(65) Prior Publication Data

US 2024/0404141 A1    Dec. 5, 2024

(51) Int. Cl.

| G06T 11/60 | (2006.01) |
|---|---|
| G06T 11/00 | (2006.01) |
| G06V 10/25 | (2022.01) |
| G06V 10/74 | (2022.01) |
| G06V 10/774 | (2022.01) |
| G06V 20/54 | (2022.01) |
| G06V 40/16 | (2022.01) |

(52) U.S. Cl.
CPC ............ *G06T 11/60* (2013.01); *G06T 11/001* (2013.01); *G06V 10/25* (2022.01); *G06V 10/74* (2022.01); *G06V 10/774* (2022.01); *G06V 20/54* (2022.01); *G06V 40/161* (2022.01)

(58) Field of Classification Search
CPC ....... G06T 11/60; G06T 11/001; G06V 10/25; G06V 10/74; G06V 10/774; G06V 20/54; G06V 40/161; G06V 20/52; G06V 20/56; G06V 20/625; G06V 20/62; G06V 40/10
See application file for complete search history.

(56) References Cited

U.S. PATENT DOCUMENTS

| 10,791,263 | B1 * | 9/2020 | Hwang | ................ H04N 23/611 |
|---|---|---|---|---|
| 11,769,233 | B1 * | 9/2023 | Poulin | ................ G06F 21/6245 |
| | | | | 386/278 |
| 2014/0112534 | A1 * | 4/2014 | Sako | ...................... G06V 40/16 |
| | | | | 382/103 |
| 2020/0074211 | A1 * | 3/2020 | Georgis | ................ G06V 20/63 |
| 2022/0292750 | A1 * | 9/2022 | Pinel | ...................... G06N 20/00 |
| 2022/0335153 | A1 * | 10/2022 | Herman | ................ G06N 3/094 |

* cited by examiner

Primary Examiner — Said Broome
Assistant Examiner — Andrew Shin
(74) Attorney, Agent, or Firm — Ingrassia Fisher & Lorenz, LLP (57) ABSTRACT

Methods and systems are provided for data processing that include cameras and processors. The cameras are configured to obtain data including frames. The processors are coupled to the cameras, and are configured to at least facilitate identifying, for each frame, regions of interest for privacy protection; extracting, for each region of interest, high level properties of the region of interest for the frame; generating a replacement image for each of the regions of interest, thereby protecting privacy while maintaining the high level properties of the region of interest; and updating the frame utilizing the replacement image for each of the one or more regions of interest, generating an updated frame that protects individual privacy.

20 Claims, 5 Drawing Sheets

LOSSLESS PRIVACY PRESERVING DATA ANONYMATION FOR ADAS/AD MODEL DEVELOPMENT

TECHNICAL FIELD

The technical field generally relates to collection of data, including personal or privacy information, and including for use in model development for assisted and automated driving vehicles.

BACKGROUND

Observational data is often required or useful for the development and training of assisted and automated driving vehicles, among various other applications. In certain circumstances, such observational data may include personal information of one or more individuals, such as a face or license plate belong to the individual. However, existing techniques may not always be optimal, for example with respect to utilizing the data in an optimal manner while also protecting privacy for the individual.

Accordingly, it is desirable to provide improved methods and systems for generating data that may include personal information, and including for use in model development and training for assisted and automated driving vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes obtaining data from one or more cameras, the data including one or more frames: identifying, for each frame of the one or more frames via one or more processors, one or more regions of interest for privacy protection: extracting, via the one or more processors for each region of interest of the one or more regions of interest, high level properties of the region of interest for the frame: generating, via the one or more processors, a replacement image for each of the one or more regions of interest, thereby protecting privacy while maintaining the high level properties of the region of interest; and for each of the one or more frames, updating the frame utilizing the replacement image for each of the one or more regions of interest, generating an updated frame that protects individual privacy via the one or more processors.

Also in accordance with an exemplary embodiment, the one or more regions of interest pertain to a license plate of a vehicle; and the replacement image includes a synthetic license plate image having the high level properties of the license plate.

Also in accordance with an exemplary embodiment, the synthetic license plate image has a font, color, style, and jurisdiction in common with the license plate, but includes a different license plate number.

Also in accordance with an exemplary embodiment, the method further incudes comparing, via the one or more processors, the replacement image with a plurality of actual license plate images from other vehicles: wherein the replacement image is utilized only when a match of statistical distribution is determined between the replacement image and the plurality of actual license plate images from the other vehicles.

Also in accordance with an exemplary embodiment, the one or more regions of interest pertain to a face of a human; and the replacement image includes a synthetic human face image having the high level properties of the face of the human.

Also in accordance with an exemplary embodiment, the synthetic human face image has an age, race, size, and in common with the face of the human, but for which the human is not recognizable from the synthetic human face image.

Also in accordance with an exemplary embodiment, the method further includes comparing, via the one or more processors, the replacement image with a plurality of actual face images from other humans: wherein the replacement image is utilized only when a match of statistical distribution is determined between the replacement image and the plurality of actual face images from the other humans.

Also in accordance with an exemplary embodiment, the data includes video camera images of vehicles and humans along one or more roadways in which the vehicles travel.

Also in accordance with an exemplary embodiment, the method further includes updating one or more datasets in computer memory using the updated frame for each of the one or more frames, generating one or more updated data sets.

Also in accordance with an exemplary embodiment, the method further includes training one or more models for control of assisted and automated driving vehicles, using the one or more updated data sets.

Also in accordance with an exemplary embodiment, the identifying of the one or more regions of interest for privacy protection, the extracting of the high level properties, the generating of the replacement image, and the updating of the frame are performed via the one or more processors disposed on a vehicle in which the data is obtained.

Also in accordance with an exemplary embodiment, the identifying of the one or more regions of interest for privacy protection, the extracting of the high level properties, the generating of the replacement image, and the updating of the frame are performed via the one or more processors disposed on a vehicle in which the data is obtained.

Also in accordance with an exemplary embodiment, the identifying of the one or more regions of interest for privacy protection, the extracting of the high level properties, the generating of the replacement image, and the updating of the frame is performed via the one or more processors disposed on one or more roadway infrastructure systems in which the data is obtained.

In another exemplary embodiment, a system is provided that includes one or more cameras and one or more processors. The one or more cameras are configured to obtain data including one or more frames. The one or more processors are coupled to the one or more cameras, and are configured to at least facilitate identifying, for each frame of the one or more frames, one or more regions of interest for privacy protection: extracting, for each region of interest of the one or more regions of interest, high level properties of the region of interest for the frame: generating a replacement image for each of the one or more regions of interest, thereby protecting privacy while maintaining the high level properties of the region of interest; and for each of the one or more frames, updating the frame utilizing the replacement image for each of the one or more regions of interest, generating an updated frame that protects individual privacy.

Also in accordance with an exemplary embodiment, the one or more regions of interest pertain to a license plate of a vehicle; and the replacement image includes a synthetic license plate image having the high level properties of the license plate.

Also in accordance with an exemplary embodiment, the one or more processors are further configured to at least facilitate: comparing the replacement image with a plurality of actual license plate images from other vehicles; and utilizing the replacement image only when a match of statistical distribution is determined between the replacement image and the plurality of actual license plate images from the other vehicles.

Also in accordance with an exemplary embodiment, the one or more regions of interest pertain to a face of a human; and the replacement image includes a synthetic human face image having the high level properties of the face of the human.

Also in accordance with an exemplary embodiment, the one or more processors are further configured to at least facilitate comparing the replacement image with a plurality of actual face images from other humans; and utilizing the replacement image only when a match of statistical distribution is determined between the replacement image and the plurality of actual face images from the other humans.

Also in accordance with an exemplary embodiment, the one or more cameras are configured to obtain the data including video camera images of vehicles and humans along one or more roadways in which the vehicles travel; and the one or more processors are further configured to at least facilitate updating one or more datasets in computer memory using the updated frame for each of the one or more frames, generating one or more updated data sets; and training one or more models for control of assisted and automated driving vehicles, using the one or more updated data sets.

In another exemplary embodiment, a system is provided that includes one or more cameras and one or more processors. The one or more cameras are configured to obtain observational data including one or more frames as to a plurality of actors, including vehicles and humans, along one or more roadways in which the vehicles travel. The one or more processors that are coupled to the one or more cameras and that are configured to at least facilitate identifying, for each frame of the one or more frames, one or more regions of interest for privacy protection pertaining to the vehicles and the humans: extracting, for each region of interest of the one or more regions of interest, high level properties of the region of interest for the frame: generating a synthetic replacement image for each of the one or more regions of interest, thereby protecting privacy while maintaining the high level properties of the region of interest: for each of the one or more frames, updating the frame utilizing the synthetic replacement image for each of the one or more regions of interest, generating an updated frame that protects individual privacy: updating one or more datasets in computer memory using the updated frame for each of the one or more frames, generating one or more updated data sets; and training one or more models for control of assisted and automated driving vehicles, using the one or more updated data sets.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
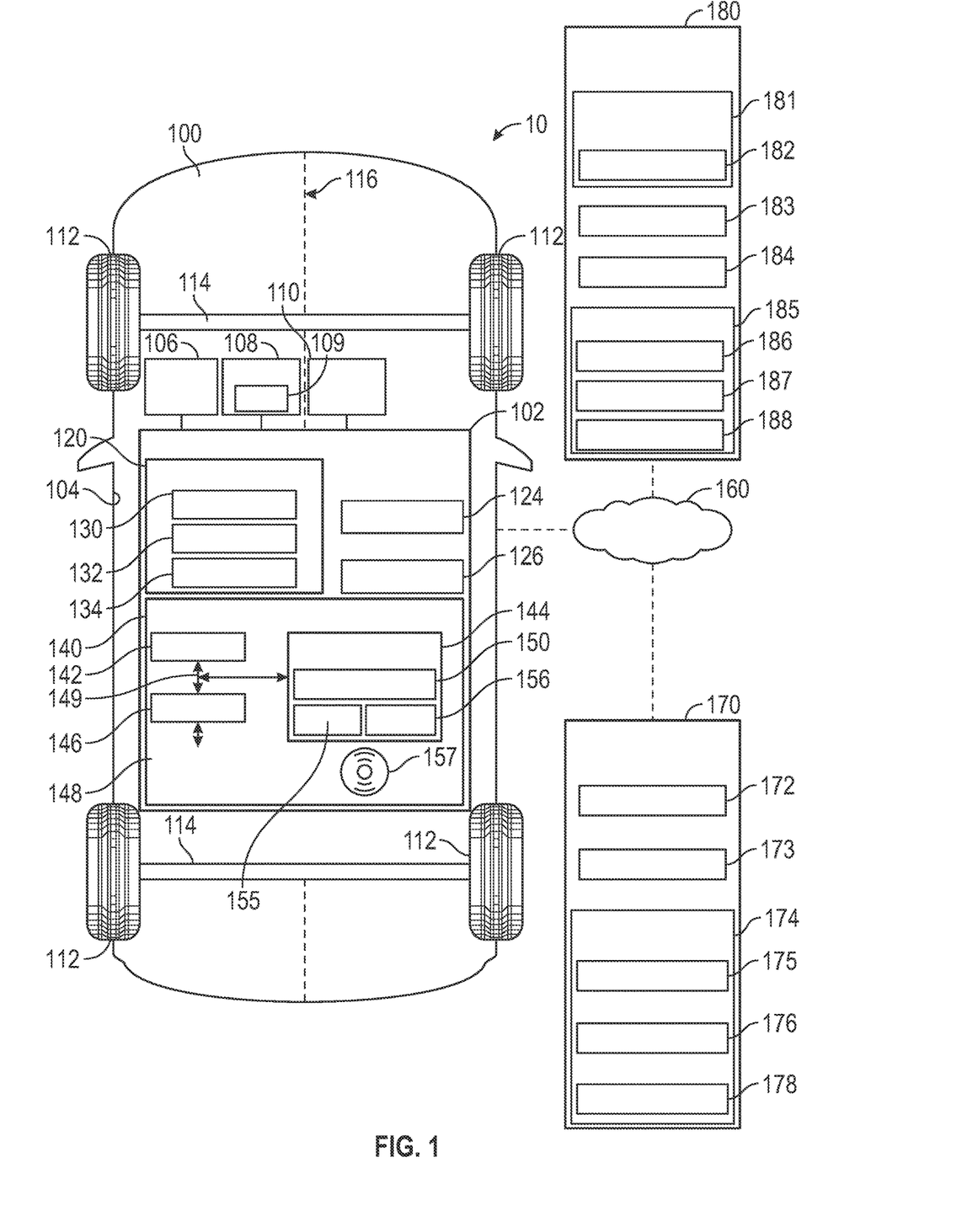
FIG. 1 is a functional block diagram of a system, including a vehicle, a remote server, and infrastructure, that is configured for generating data that includes personal information, and that can be used in connection with autonomous vehicle training and/or other contexts, in accordance with an exemplary embodiment.

FIG. 1 illustrates a system 10. In various embodiments, and as described below, the system 10 includes one or more vehicles 100, remote servers 170, and infrastructure 180. In various embodiments, the system 10 provides for the generating of data, including observational data pertaining to personal information (such as a human face and a vehicle license plate number), in a manner that protects privacy for the personal information while also maintaining maximum use of the data. In various embodiments, the system 10 performs these tasks in accordance with the process 200 of FIG. 2 and the sub-processes and implementations thereof of FIGS. 3-6, in accordance with exemplary embodiments.

Specifically, as described in greater detail further below; in various embodiments the vehicles 100 and infrastructure 180 collect observational data that includes personal information, such as depictions of faces of human individuals and/or license plate numbers and information for individual vehicles (e.g., of the vehicles 100 and/or other vehicles), and so on. Also in various embodiments and as described in greater detail further below, the system 10 processes the observational data in a manner that protects the personal information (and associated privacy) but that also maintains optimal efficacy for the data. For example, as described in greater detail further below in connection with FIG. 1 as well as FIGS. 2-6, the system 10 replaces the personal information (including the face and license plate number) with synthetic replacement information that protects personal privacy but that also includes high level details of this information (which thereby provides more value for the data as compared with merely blocking out or blurring the personal information, and so on). In various embodiments, the processing of the data in this manner is performed via one or more processors depicted in FIG. 1, such as the processor 142 of the vehicle 100, the processor 184 of the infrastructure 180, and/or the processor 173 of the remote server 170 of FIG. 1.

Figure 2:
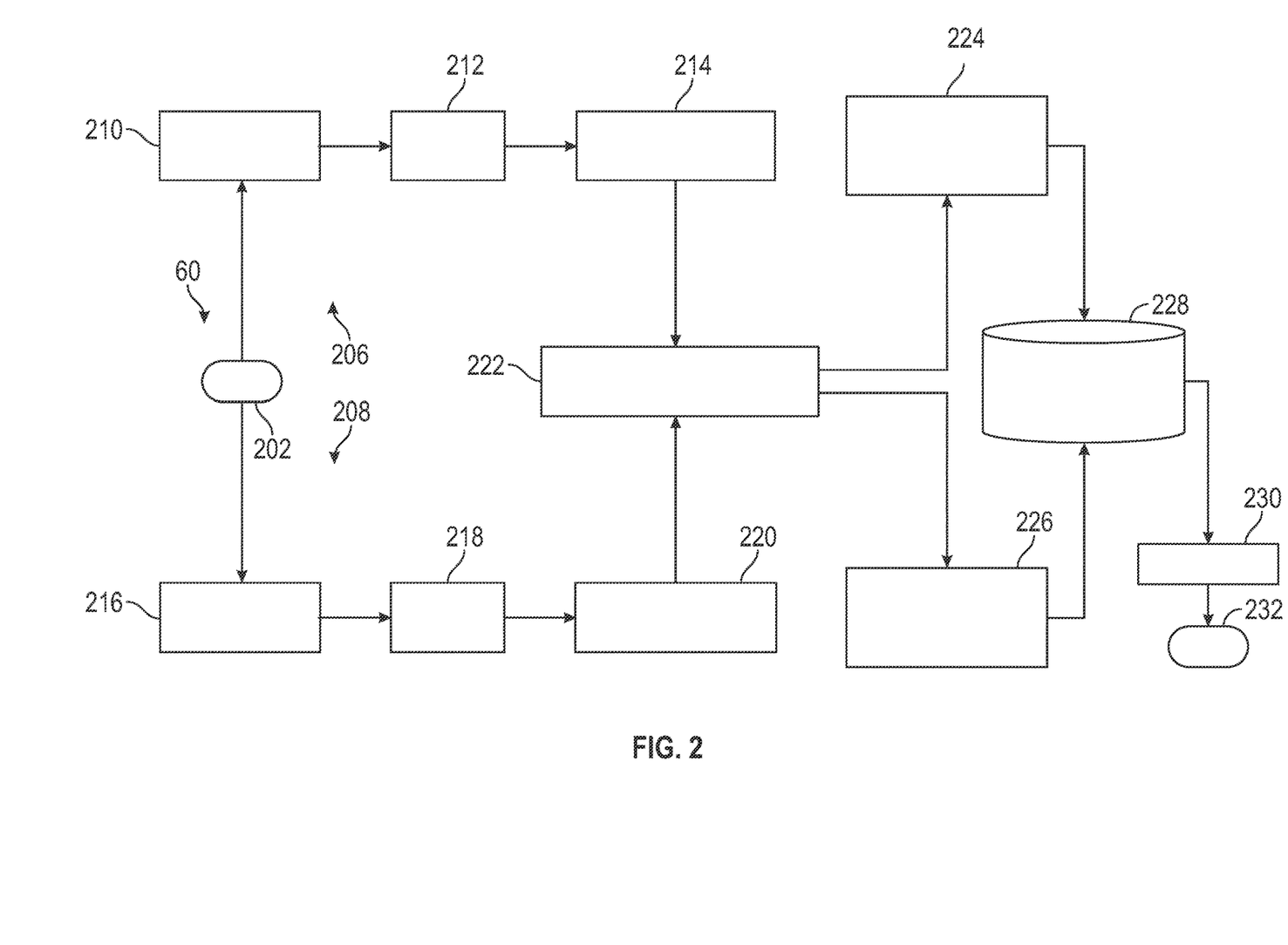
FIG. 2 is a flowchart of a process for generating data that includes personal information, and that can be used in connection with the system of FIG. 1, in accordance with an exemplary embodiment.

In various embodiments, the vehicle 100 represents one of a number of different vehicles 100 that operate on roads or other paths (collectively referred to as "roadways" herein). While a single vehicle 100 is depicted in FIG. 1, it will be appreciated that the system 10 may include any number of vehicles 100 that, working together and with the remote server 170 and the infrastructure 180 in certain embodiments, collectively perform the process 200 that is depicted in FIG. 2 and the sub-processes and implementations of FIGS. 3-6 and described further below in connection therewith. In addition, while the singular term "vehicle" may be used at times, it will be appreciated that this refers to any number of different vehicles (e.g., in a fleet or otherwise used together in the system 10 and in performing the process 200 of FIG. 2 and the sub-processes and implementations of FIGS. 3-6).

In various embodiments, each vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, some of the vehicles 100 (in a fleet) may be operated in whole or in part by a human drivers, whereas other of the vehicles 100 may comprise an autonomous or semi-autonomous vehicle, for example in which vehicle control (including acceleration, deceleration, braking, and/or steering) is automatically planned and executed by the control system 102, in whole or in part. In addition, certain vehicles 100 may be operated by a human at certain times and via automated control at other times, in certain embodiments. Also in various embodiments, some of the vehicles 100 include automatic functionality via computer models that are trained using the data that is generated and processed via the system 10 after protection of the privacy thereof.

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions that may be controlled automatically via the control system 102, for example in certain circumstances. In certain embodiments, some of the vehicles 100 may be operated by human drivers, whereas other of the vehicles 100 may be assisted and automated driving vehicles, such as a semi-autonomous vehicle or a fully autonomous vehicle, for automated control of the drive system 110 and/or other vehicle components. However, this may vary in other embodiments, for example in which a human driver may control the drive system 110.

As depicted in FIG. 1, the vehicle 100 also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering wheel 109 that is part of a steering column coupled to the axles 114 and/or the wheels 112) that are controlled via inputs provided by a driver (e.g., via the steering wheel 109 in certain embodiments) and/or automatically via the control system 102.

In the embodiment depicted in FIG. 1, in certain embodiments, the control system 102 is coupled to the braking system 106, the steering system 108, and the drive system 110. In various embodiments, the control system 102 at least facilitates the generating and processing of observational data for the vehicle 100 and/or for other vehicles. In addition, in certain embodiments in which the vehicle 100 is an autonomous or semi-autonomous vehicle, the control system 102 also provides in certain circumstances control over automated features of the vehicle 100 (including automated operation of the braking system 106, the steering system 108, and/or the drive system 110), including using one or more models that are trained using the observational data.

As depicted in FIG. 1, in various embodiments, the control system 102 includes a sensor array 120, a display 124, a transceiver 126, and a controller 140.

In various embodiments, the sensor array 120 obtains sensor data for generating the observational data. In various embodiments, the sensor array 120 includes one or more cameras 130 (such as video cameras and/or in certain embodiments still image camera). Also in certain embodiments, the sensor array 120 may also include one or more other detection sensors 132 (e.g., radar, sonar, LIDAR, or the like) and/or other sensors 134 (e.g., vehicle position sensors, speed sensors, accelerometers, braking sensors, steering sensors, and so on).

In various embodiments, the cameras 130 obtain the observational data for the vehicle 100. In various embodiments, the observational data pertains to a roadway on which the vehicle 100 is operating and activities and actors thereof, such as position and movement of pedestrians, vehicles, drivers, and various other details of the roadway and activity pertaining thereto. In various embodiments, video camera images are obtained. In certain embodiments, still camera images may also be obtained. In various embodiments, the observational data includes personal information, such as the faces of human individuals and the license plate numbers of individual vehicles (and, for example, that might be protected by applicable laws, regulations, and/or rules).

In various embodiments, the detection sensors 132 and/or other sensors 134 obtain additional information as to the roadway and/or the operation of the vehicle 100 itself (e.g., position, speed, acceleration thereof, and so on) for use in operating the vehicle 100, for example in accordance with autonomous operation of the vehicle 100 and/or of certain components thereof.

In certain embodiments, the vehicle 100 also includes a transceiver 126. In various embodiments, the transceiver 126 communicates with the remote server 170 and/or infrastructure 180 pertaining to the observational data and/or the processing thereof.

In certain embodiments, the display 124 provides information for a driver and/or other passengers of the vehicle 100, for example pertaining to the observational data and/or the operation of the vehicle 100.

In various embodiments, the controller 140 is coupled to the sensor array 120, as well as to the braking system 106, the steering system 108, the drive system 110. In various embodiments, the controller 140 is also coupled to the display 124 and the transceiver 126.

In various embodiments, the controller 140 comprises a computer system, and includes a processor 142, a memory 144, an interface 146, a storage device 148, and a computer bus 149. In various embodiments, the controller (or computer system) 140 obtains sensor data from the sensor array 120, and in certain embodiments additional data via the transceiver 126. In various embodiments, the controller 140 processes the observational data, including the preservation of privacy while maintaining maximum efficacy for the observational data. In certain embodiments, the controller 140 also uses the observational data for developing, training, and/or implementing one or more autonomous driving models for the vehicle 100 (e.g., for automated control of the braking system 106, steering system 108, and/or drive system 110, and/or one or more related features such as blind spot or pedestrian detection, and so on). In various embodiments, the controller 140 provides these and other functions in accordance with the steps of the processes and implementations depicted in FIGS. 2-6 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely. In certain embodiments, the controller 140 of the vehicle 100 also performs functions in concert with the remote server 170 and/or the infrastructure 180, described further below.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 149. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 150 contained within the memory 144 and, as such, controls the general operation of the controller 140 and the computer system of the controller 140, generally in executing the processes described herein, such as the processes and implementations depicted in FIGS. 2-6 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 150 along one or more databases 155 (e.g., pertaining to the observational data) and other stored values 156 (e.g., including threshold values for the processing of the observational data as set forth in the processes and implementations depicted in FIGS. 2-6 and as described further below in connection therewith in accordance with exemplary embodiments).

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the navigation system 122. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 150 that executes one or more embodiments of the processes and implementations of FIG. 2 and as described further below in connection therewith. In another exemplary embodiment, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, in various embodiments the vehicle 100, the remote server 170, and the infrastructure 180 communicate via one or more communications networks 160. In various embodiments, the communications networks 160 may include one or more wireless communications networks (e.g., satellite-based, cellular, and/or any number of other different types of wireless communications networks).

Also in various embodiments, the remote server 170 is disposed remote from, or a significant physical distance from, each of the vehicles 100 (e.g., in a fleet) and the infrastructure 180. In various embodiments, as depicted in FIG. 1, the remote server 170) includes one or more transceivers 172, processors 173, and computer memory 174 storing a map database 176 along with stored values 178. In various embodiments, the transceiver 172 is utilized to communicate with the vehicle 100 and the infrastructure 180, including with respect to the observational data and the processing thereof. As depicted in FIG. 1, the transceiver 172, processor 173, memory 174, database 176, and stored values 178 are similar or identical to the corresponding features of the vehicle 100 (e.g., as to the transceiver 126, processor 142, memory 144, database 155, and stored values 156 thereof). Also in certain embodiments, the processor 173 processes, or facilitates processing of, the observational data from the vehicle 100 (and/or from the infrastructure 180), including for the protection of privacy while maintaining maximum efficacy for the observational data (e.g., as described further below in connection with the processes and implementations of FIGS. 2-6).

Also in various embodiments, the infrastructure 180 is disposed apart from the vehicles 100 and the remote server 170. In various embodiments, the infrastructure 180) comprises one or more smart traffic lights, smart traffic signs, or the like, among other possible devices and/or systems, which generate observational data that includes personal information (such as human faces and vehicle license plate numbers). In various embodiments, as depicted in FIG. 1, the infrastructure 180) includes one or more sensors 181 that include one or more cameras 182 for obtaining the observational data (e.g., similar to the sensor array 120, including the cameras 130, of the vehicle 100). Also in various embodiments the infrastructure 180 also includes one or more transceivers 183, processors 184, and computer memory 185 storing a database 187 along with stored values 188. In various embodiments, the transceiver 183 is utilized to communicate with the vehicle 100 and the remote server 170, including with respect to the observational data and the processing thereof. As depicted in FIG. 1, the transceiver 183, processor 184, memory 185, database 187, and stored values 188 are similar or identical to the corresponding features of the vehicle 100 (e.g., as to the transceiver 126, processor 142, memory 144, database 155, and stored values 156 thereof). Also in certain embodiments, the processor 184 processes, or facilitates processing of, the observational data from the vehicle 100 (and/or from the infrastructure 180 itself), including for the protection of privacy while maintaining maximum efficacy for the observational data (e.g., as described further below in connection with the processes and implementations of FIGS. 2-6).

FIG. 2 is a flowchart of a process 200 for generating data that includes personal information, and that can be used in connection with the system 10 of FIG. 1, in accordance with an exemplary embodiment. The process 200 of FIG. 2 is described in greater detail below in connection with FIG. 2 as well as FIGS. 3 and 4 (which depict illustrative subprocesses of the process 200) and FIGS. 5 and 6 (which depict exemplary implementations of the process 200).

With continued reference to FIG. 2, in various embodiments the process 200 begins at step 202. In various embodiments, the process 200 begins when observational data is being collected or to be collected (e.g., by the vehicle 100 and/or infrastructure 180 of FIG. 1).

In various embodiments, data images are processed to preserve privacy along a first path 206, a second path 208, or both, as illustrated in FIG. 2. In various embodiments, the first path 206 pertains to the protection of vehicle license plate information, beginning with step 210. In various embodiments, this first path 206 is also represented as a subprocess in FIG. 3 that is associated with the first path 206, and an associated implementation of FIG. 6. In various embodiments, the second path 208 pertains to the protection of human facial information, beginning with step 216. In various embodiments, this second path 208 is also represented as a subprocess in FIG. 4 that is associated with the second path 208, and an associated implementation of FIG. 5.

With continued reference to FIG. 2, during step 210 of the first path 206, camera video frames are obtained and identified in an exemplary embodiment. In various embodiments, the camera video frames comprise images of observational data including one or more vehicles, obtained from one or more cameras such as the cameras 130 of the vehicle 100 and/or the cameras 182 of the infrastructure 180. In various embodiments, each camera video frame is analyzed separately via one or more of the processors of FIG. 1.

In addition, in various embodiments, during step 212, for each camera video frame, an identification is made of a vehicle license plate in the camera video frame. In various embodiments, this is performed via one or more of the processors of FIG. 1 using the observational data.

Also in various embodiments, selected properties are extracted from the video frame (step 214). In various embodiments, certain selected high level, or abstract properties, are extracted as to the license plate from the video frame via one or more of the processors of FIG. 1. Also in certain embodiments, the extracted features include a font, color, style, and jurisdiction and/or authority pertaining to the license plate.

Also in various embodiments, and with reference now to the second path 208, in various embodiments during step 216 of the second path 208, camera video frames are obtained and identified in an exemplary embodiment. In various embodiments, the camera video frames comprise images of observational data including one or more humans, obtained from one or more cameras such as the cameras 130 of the vehicle 100 and/or the cameras 182 of the infrastructure 180. In various embodiments, each camera video frame is analyzed separately via one or more of the processors of FIG. 1.

In addition, in various embodiments, during step 218, for each camera video frame, an identification is made of a human face in the camera video frame. In various embodiments, this is performed via one or more of the processors of FIG. 1 using the observational data.

Also in various embodiments, selected properties are extracted from the video frame (step 220). In various embodiments, certain selected high level, or abstract properties, are extracted as to the human face from the video frame via one or more of the processors of FIG. 1. Also in certain embodiments, the extracted features include an estimated age, race, size, gender, and the like of the human face.

In various embodiments, further processing is performed on the images of both paths (step 222). Specifically, in various embodiments, during step 222 generative artificial intelligence processing is applied to the images, and in particular with respect to the vehicle license plate(s) and human face(s) detected in the video camera frames. In certain embodiments, a generative artificial intelligence (AI) module is applied to the observational data with respect to the license plate and the human face, via a text to image generator. In various embodiments, this is performed via one or more of the processors of FIG. 1.

In various embodiments, as a result of the generative artificial intelligence processing as applied to both the license plate and the human face, privacy preserving lossless output is generated in steps 224 and 226.

Specifically, in various embodiments, during step 224 (as part of the first path 206), privacy preserving lossless output is generated via one or more processors of FIG. 1 that replaces the actual license plate of the camera video frame with a synthetic replacement license plate that is generated so as to have a different license plate number from the actual license plate, but with other similar high level characteristics as to the actual license plate (e.g., with the same or similar font, color, style, and jurisdiction and/or authority pertaining to the license plate).

Moreover, also in various embodiments, during step 226 (as part of the second path 208), privacy preserving lossless output is generated via one or more processors of FIG. 1 that replaces the actual human face of the camera video frame with a replacement "human" face that is generated so as to have a different actual face from the actual human face in the image, but with other similar high level characteristics as to the actual human face in the image (e.g., with the same or similar estimated age, race, size, gender, and the like of the human face in the image).

In various embodiments, one or more datasets are updated (step 228). Specifically, in various embodiments, during step 228 one or more datasets are obtained with respect to the observational data, with the privacy protections associated with the output of steps 224 and step 226. Specifically, in various embodiments, the updated datasets of step 228 include the observational data of steps 210, 216, but with the license plate numbers, human faces, and/or other personal/private information replaced with the synthetic output of steps 224 and 226 to include the respective high level characteristics while maintaining individual privacy and the efficacy of the data set. In various embodiments, the updated datasets of step 228 are represented in the database 155 of the vehicle 100, the database 178 of the remote server 170, and/or the database 187 of the infrastructure 180.

In various embodiments, the updated data is implemented (step 230). In various embodiments, the updated datasets of step 228 are utilized in the development and training of models for assisted and automated driving vehicles, such as the vehicle 100 and/or other vehicles. Specifically, in certain embodiments, one or more of the processors of FIG. 1 utilize the updated observational data from the updated datasets of FIG. 1 to develop and training one or more autonomous vehicle models for operation of the assisted and automated driving vehicles using machine learning, such as for automated control of the braking system 106, steering system 108, and/or drive system 110, and/or one or more related features such as blind spot or pedestrian detection, and so on.

In various embodiments, the process then terminates at step 232.

Figure 3:
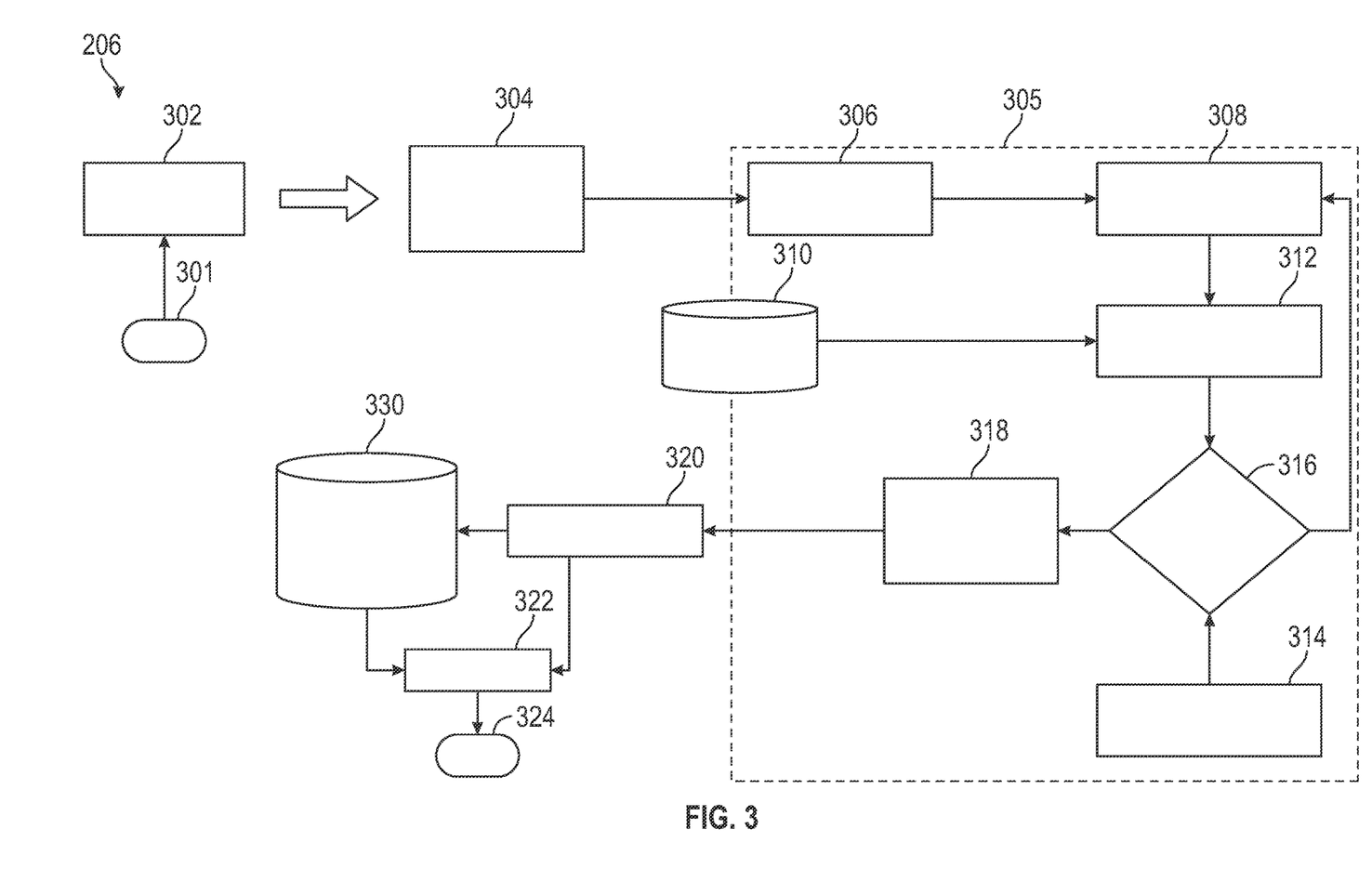
FIG. 3 is a flowchart of a sub-process for the process of FIG. 2, namely for generating data that includes a license plate of a vehicle, and that can be used in connection with the system of FIG. 1, in accordance with an exemplary embodiment.

FIG. 3 is a flowchart of a sub-process for the process 200 of FIG. 2 corresponding to the first path 206 of FIG. 2, namely for generating data that includes a license plate of a vehicle, and that can be used in connection with the system 10 of FIG. 1, in accordance with an exemplary embodiment. The sub-process of FIG. 3 is also described herein in connection with FIG. 6, which depicts an exemplary implementation of the process 200 in which the observational data pertains to a license plate of a vehicle, in accordance with an exemplary embodiment.

As depicted in FIG. 3, in various embodiments, the process begins at step 301, during the first path 206 of the process 200 of FIG. 1 when the data images are analyzed with respect to the camera video frames of step 210 of FIG. 1.

In various embodiments, for each camera video frame, an identification is made at step 302 of FIG. 3 of a vehicle license plate in the camera video frame. In various embodiments, this is performed via one or more of the processors of FIG. 1 using the observational data. Specifically, with reference to FIG. 6A, in various embodiments during step 302 a license plate 603 of a vehicle 602 is detected for a particular image 601, along with a body 604 of the vehicle 602 and/or other features thereof.

Figures 6A, 6B, 6C:
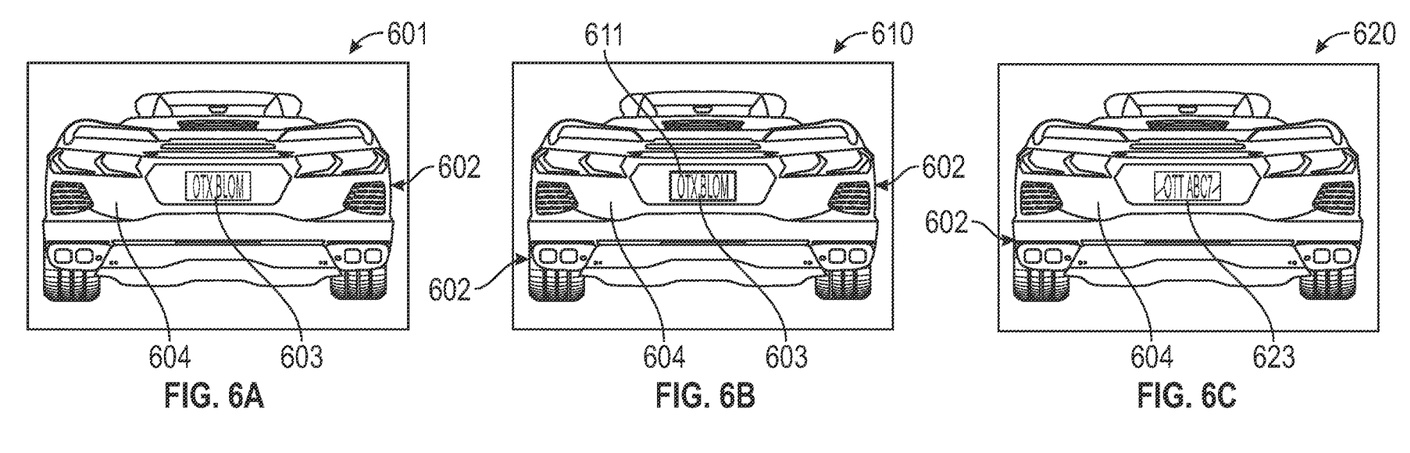
FIG. 6A, FIG. 6B, and FIG. 6C (collectively also referred to herein as FIG. 6) provide another exemplary implementation of the process of FIG. 2, including the sub-process of FIG. 3, in accordance with an exemplary embodiment.

With reference back to FIG. 3, in various embodiment mask detection and segmentation is provided (step 304). In various embodiments, this is performed via one or more of the processors of FIG. 1 using the observational data. Specifically, with reference to FIG. 6B, in various embodiments during step 304 a region of interest 611 (e.g., a rectangular frame) is generated with respect to the license plate 603 in a first updated image 610. As depicted in FIG. 6B, in various embodiments, the region of interest 611 includes the license plate 603 but not the body 604 or additional components of the vehicle 602.

With reference back to FIG. 3, in various embodiment additional processing is performed, as denoted in combined step (or sub-process) 305 of FIG. 3. In various embodiments, the various steps of the combined step 305 (described below) are performed by one or more of the processors of FIG. 1.

Specifically, in various embodiments, as part of combined step 305, abstract properties are extracted from the image (step 306). Specially, similar to the discussion above, in various embodiments, certain selected high level, or abstract properties, are extracted as to the license plate from the video frame via one or more of the processors of FIG. 1. Also in certain embodiments, the extracted features include a font, color, style, and jurisdiction and/or authority pertaining to the license plate.

In various embodiments, a license plate generator is utilized to generate an updated license plate for the image (step 308). Specifically, in various embodiments, one or more of the processors of FIG. 1 generate a new, made up, synthetic license plate for the image that includes the high level, abstract features of the original license plate, but that do not have the personal information (e.g., the license plate number) of the original license plate. In various embodiments, this is performed using generative artificial intelligence, for example as described above in connection with step 222 of FIG. 2.

In addition, in various embodiments, during step 312, actual license plate images from other vehicles (other than the vehicle 100) are obtained from one or more databases 310 (such as the databases illustrated in FIG. 1) and compared with the updated license plate that was generated from step 308. In various embodiments, these steps are performed via one or more of the processors of FIG. 1.

In various embodiments, a determination is made as to whether a match exists (step 316). Specifically, in various embodiments, a determination is made as to whether a match exists between the generated license plate of step 308 and the actual license plates from other vehicles of step 312. In certain embodiments, a match of statistical distribution is determined to exist when differences between the license plate of step 308 and the actual license plates from other vehicles of step 312 are less than a predetermined calibratable threshold 314 (e.g., stored as one of the stored values of FIG. 1). Also in certain embodiments, the determination as to whether the match exists is performed via the one or more processors using the predetermined calibratable threshold 314 using a Gaussian distribution, including the mean and the variance of the pixels and/or other image properties.

In various embodiments, if it is determined during step 316 that a match does not exist, then the process returns to step 308, as a new updated license plate is generated for the image. In various embodiments, steps 308-316 thereafter repeat until a determination is made during an iteration of step 316 that a match exists.

In various embodiments, once a determination is made during an iteration of step 316 that a match exists, then the process 200 proceeds to step 318. In various embodiments, during step 318, privacy preserving output is generated. In various embodiments, similar to step 224 described above in connection with FIG. 2, as a result of the generative artificial intelligence processing as applied to the license plate, the privacy preserving lossless output is generated that replaces the actual license plate of the camera video frame with a replacement synthetic license plate that is generated so as to have a different license plate number from the actual license plate, but with other similar high level characteristics as to the actual license plate (e.g., with the same or similar font, color, style, and jurisdiction and/or authority pertaining to the license plate). For example, with reference to FIG. 6C, in various embodiments, a new, updated license plate 623 is provided in a second updated image 620 (without any changes to the body 604 or other components of the vehicle 602).

In various embodiments, one or more datasets are updated (step 320). Specifically, and similar to step 228 of FIG. 2, in various embodiments during step 320 one or more datasets are obtained with respect to the observational data, but with the privacy protections associated with the output of step 318. Specifically, in various embodiments, the updated datasets of step 320 include the observational data, but with the license plate numbers and/or other personal/private information replaced with the new generated license plate of step 308. In various embodiments, the updated datasets of step 320 are represented in FIG. 3 as updated database 330. In various embodiments, this updated database 330 may be represented in the database 155 of the vehicle 100, the database 178 of the remote server 170, and/or the database 187 of the infrastructure 180 of FIG. 1.

In various embodiments, the updated data is implemented (step 322). Similar to step 230 of FIG. 2, in various embodiments the updated datasets are utilized in the development and training of models for assisted and automated driving vehicles, such as the vehicle 100 and/or other vehicles. Specifically, in certain embodiments, one or more of the processors of FIG. 1 utilize the updated observational data from the updated datasets of FIG. 1 to develop and training one or more autonomous vehicle models for operation of the assisted and automated driving vehicles using machine learning, such as for automated control of the braking system 106, steering system 108, and/or drive system 110, and/or one or more related features such as blind spot or pedestrian detection, and so on.

In various embodiments, the process then terminates at step 324.

Figure 4:
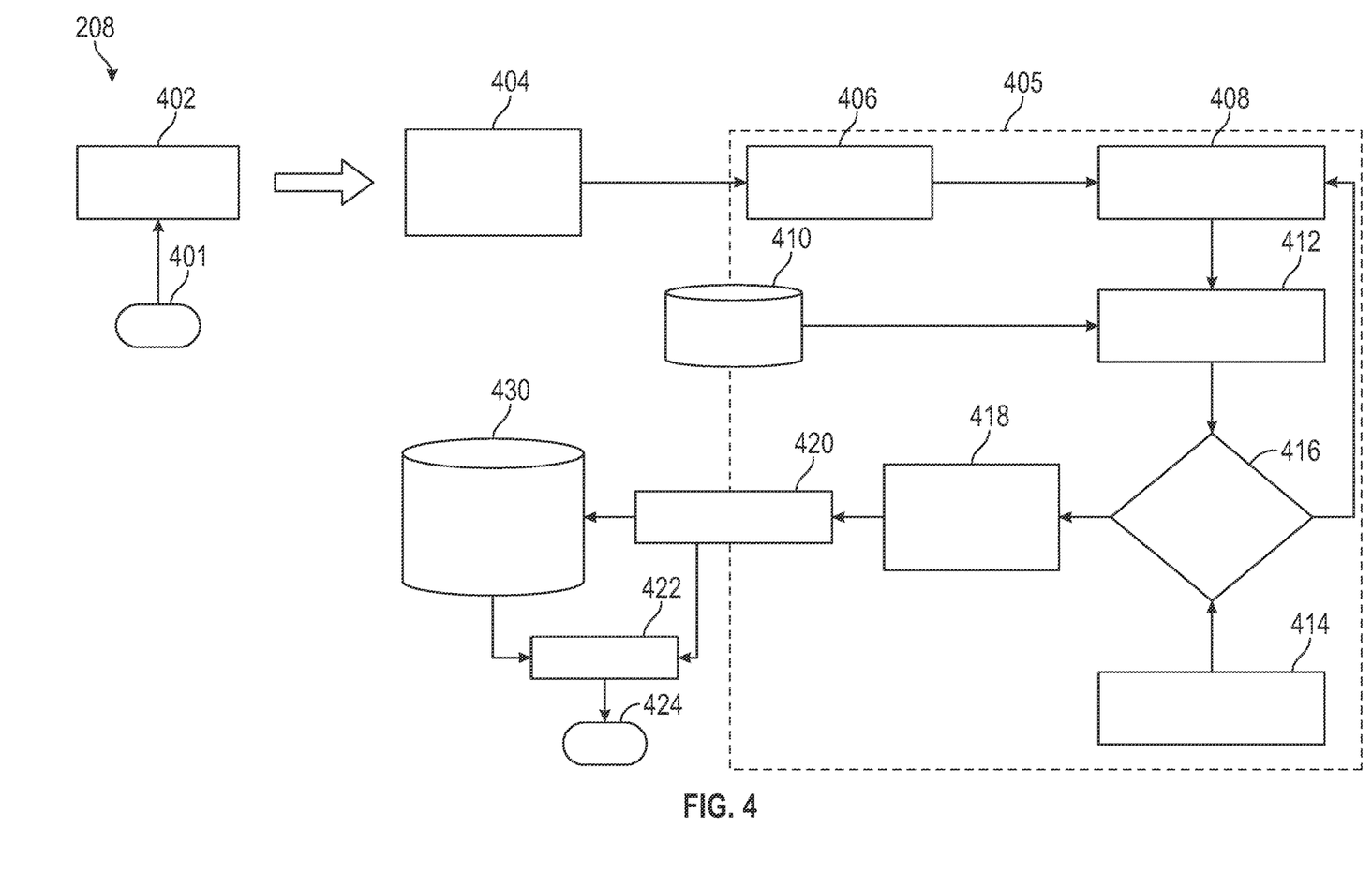
FIG. 4 is a flowchart of a sub-process for the process of FIG. 2, namely for generating data that includes a face of an individual, and that can be used in connection with the system of FIG. 1, in accordance with an exemplary embodiment.

With reference now to FIG. 4, a flowchart of a sub-process for the process 200 of FIG. 2 corresponding to the second path 208 of FIG. 2, namely for generating data that includes a human face, and that can be used in connection with the system 10 of FIG. 1, in accordance with an exemplary embodiment. The sub-process of FIG. 4 is also described herein in connection with FIG. 5, which depicts an exemplary implementation of the process 200 in which the observational data pertains to a human face, in accordance with an exemplary embodiment.

As depicted in FIG. 4, in various embodiments, the process begins at step 401, during the second path 208 of the process 200 of FIG. 1 when the data images are analyzed with respect to the camera video frames of step 210 of FIG. 1.

In various embodiments, for each camera video frame, an identification is made at step 402 of FIG. 4 of a human face in the camera video frame. In various embodiments, this is performed via one or more of the processors of FIG. 1 using the observational data. Specifically, with reference to FIG. 5A, in various embodiments during step 402 faces 503, 506 of respective humans 502, 505 are detected for a particular image 501, along with bodies 504, 507 of the respective humans 502, 505 and/or other features thereof.

Figure 5A:
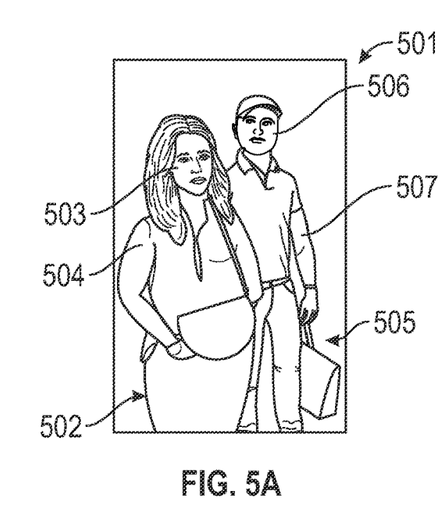
FIG. 5A, FIG. 5B, and FIG. 5C (collectively also referred to herein as FIG. 5) provide an exemplary implementation of the process of FIG. 2, including the sub-process of FIG. 4, in accordance with an exemplary embodiment.
Figure 5B:
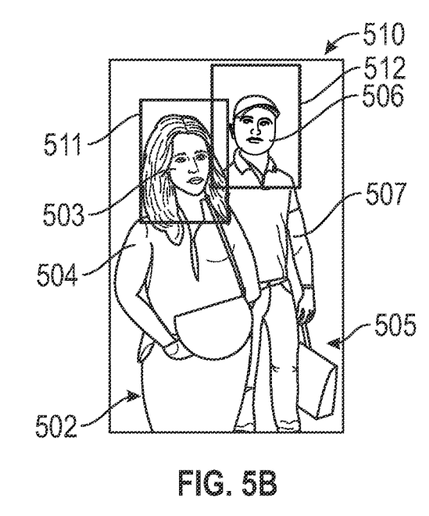
Figure 5C:
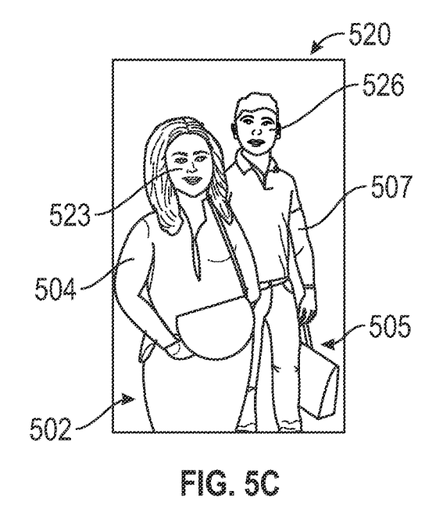

With reference back to FIG. 4, in various embodiment mask detection and segmentation is provided (step 404). In various embodiments, this is performed via one or more of the processors of FIG. 1 using the observational data. Specifically, with reference to FIG. 5B, in various embodiments during step 404 regions of interest 511, 512 (e.g., rectangular frames) are generated with respect to the faces 503, 506 of the respective humans 502, 505 in a first updated image 510. As depicted in FIG. 5B, in various embodiments, the regions of interest 511, 512 include the faces 503, 506 but not the bodies 504, 507 of the respective humans 502, 505.

With reference back to FIG. 4, in various embodiments additional processing is performed, as denoted in combined step (or sub-process) 405 of FIG. 4. In various embodiments, the various steps of the combined step 405 (described below) are performed by one or more of the processors of FIG. 1.

Specifically, in various embodiments, as part of combined step 405, abstract properties are extracted from the image (step 406). Specially, similar to the discussion above, in various embodiments, certain selected high level, or abstract properties, are extracted as to the human faces from the video frame via one or more of the processors of FIG. 1. Also in certain embodiments, the extracted features include age, race, size, and gender pertaining to the license human face.

In various embodiments, a human face generator is utilized to generate an updated face (or faces) for the image (step 408). In certain embodiments, the human face generator may be referred to as a vulnerable road user (VRU) face generator, for example with respect to human pedestrians on the roadway. Specifically, in various embodiments, one or more of the processors of FIG. 1 generate a new, made up, synthetic face image for one or more humans for the image that includes the high level, abstract features of the human face(s), but in a manner such that the particular face(s) cannot be recognized, and thereby preserving the privacy for the human(s). In various embodiments, this is performed using generative artificial intelligence, for example as described above in connection with step 222 of FIG. 2.

In addition, in various embodiments, during step 412, actual human facial images from other humans are obtained from one or more databases 410 (such as the databases illustrated in FIG. 1) are obtained and compared with the human face(s) that were generated from step 408. In various embodiments, these steps are performed via one or more of the processors of FIG. 1.

In various embodiments, a determination is made as to whether a match exists (step 416). Specifically, in various embodiments, a determination is made as to whether a match exists between the human face(s) of step 408 and the actual human faces from other humans of step 412. In certain embodiments, a match of statistical distribution is determined to exist when differences between the human face(s) of step 408 and the human faces from other humans of step 412 are less than a predetermined calibratable threshold 414 (e.g., stored as one of the stored values of FIG. 1). Also in certain embodiments, the determination as to whether the match exists is performed via the one or more processors using the predetermined calibratable threshold 414 using a Gaussian distribution, including the mean and the variance of the pixels and/or other image properties.

In various embodiments, if it is determined during step 416 that a match does not exist, then the process returns to step 408, as a new updated human faces are generated for the image. In various embodiments, steps 408-416 thereafter repeat until a determination is made during an iteration of step 416 that a match exists.

In various embodiments, once a determination is made during an iteration of step 416 that a match exists, then the process 200 proceeds to step 418. In various embodiments, during step 418, privacy preserving output is generated. In various embodiments, similar to step 226 described above in connection with FIG. 2, as a result of the generative artificial intelligence processing as applied to the human faces, the privacy preserving lossless output is generated that replaces the actual human faces of the camera video frame with replacement synthetic human faces that are generated so as to have a different face that is not identifiable with the actual human faces (so as to preserve privacy), but with other similar high level characteristics as to the actual human faces (e.g., with the same or similar age, race, size, and/or gender as the original human faces). For example, with reference to FIG. 5C, in various embodiments, new; updated human faces 523, 526 are provided in a second updated image 520 (without any changes to the bodies 504, 507 or other components of the humans 502, 505).

In various embodiments, one or more datasets are updated (step 420). Specifically, and similar to step 228 of FIG. 2, in various embodiments during step 420 one or more datasets are obtained with respect to the observational data, but with the privacy protections associated with the output of step 418. Specifically, in various embodiments, the updated datasets of step 420 include the observational data, but with the faces of the humans replaced with the new generated faces of step 408. In various embodiments, the updated datasets of step 420 are represented in FIG. 4 as updated database 430. In various embodiments, this updated database 430 may be represented in the database 155 of the vehicle 100, the database 178 of the remote server 170, and/or the database 187 of the infrastructure 180 of FIG. 1.

In various embodiments, the updated data is implemented (step 422). Similar to step 230 of FIG. 2, in various embodiments the updated datasets are utilized in the development and training of models for assisted and automated driving vehicles, such as the vehicle 100 and/or other vehicles. Specifically, in certain embodiments, one or more of the processors of FIG. 1 utilize the updated observational data from the updated datasets of FIG. 1 to develop and training one or more autonomous vehicle models for operation of the assisted and automated driving vehicles using machine learning, such as automated control of the braking system 106, steering system 108, and/or drive system 110, and/or one or more related features such as blind spot or pedestrian detection, and so on.

In various embodiments, the process then terminates at step 424.

Accordingly, methods, systems, and vehicles are provided for generating datasets that protect privacy with still maintaining optimal efficacy for the data sets. In various, observational data from video cameras is processed such that personal information such as license plates and human faces are replaced with made-up license plates, human faces, and the like that protect privacy while maintaining high level characteristics of the license plates, human faces, and the like. In various embodiments, the processed data thereby protects personal privacy while at the same time maintaining optimal efficacy for the observational data. In various embodiments, the observational data, after processed to maintain privacy, is utilized in developing and training models for assisted and automated driving vehicles, such as for automated control of the braking system 106, steering system 108, and/or drive system 110, and/or one or more related features such as blind spot or pedestrian detection, and so on.

In various embodiments, the detection and protection and privacy with respect to the license plate numbers and human faces thereby allows maximum efficacy while maintaining privacy as well as compliance with applicable governmental, institutional, and/or other laws, regulations, and/or requirements. In various embodiments, other personal information, instead of and/or in addition to the license plate information and human faces, may also be treated in a similar manner via the processes and implementations described herein for protecting privacy while also maintain the efficacy of the observational data.

It will be appreciated that the systems, vehicles, and methods may vary from those depicted in the Figures and described herein. For example, the system 10 of FIG. 1, including vehicle 100, remote server 170, and infrastructure of FIG. 1 and components thereof, may differ from that depicted in FIG. 1. It will similarly be appreciated that the steps of the processes and implementations of FIGS. 2-6 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining data from one or more cameras, the data including one or more frames;
   identifying, for each frame of the one or more frames via one or more processors, one or more regions of interest for privacy protection, the one or more regions of interest pertain to a license plate of a vehicle;
   extracting, via the one or more processors for each region of interest of the one or more regions of interest, high level properties of the region of interest for the frame;
   generating, via the one or more processors, a replacement image for each of the one or more regions of interest, thereby protecting privacy while maintaining the high level properties of the region of interest, the replacement image comprising a synthetic license plate image having the high level properties of the license plate;
   comparing, via the one or more processors, the replacement image with a plurality of actual license plate images from other vehicles; and
   for each of the one or more frames, updating the frame utilizing the replacement image for each of the one or more regions of interest, generating an updated frame that protects individual privacy via the one or more processors, wherein the replacement image is utilized only when a match of statistical distribution is determined between the replacement image and the plurality of actual license plate images from the other vehicles.

2. The method of claim 1, wherein the synthetic license plate image has a font, color, style, and jurisdiction in common with the license plate, but includes a different license plate number.

3. The method of claim 1, wherein:
   the one or more regions of interest further pertain to a face of a human; and
   the replacement image further comprises a synthetic human face image having the high level properties of the face of the human.

4. The method of claim 3, wherein the synthetic human face image has an age, race, size, and in common with the face of the human, but for which the human is not recognizable from the synthetic human face image.

5. The method of claim 3, further comprising:
   comparing, via the one or more processors, the replacement image with a plurality of actual face images from other humans;
   wherein the replacement image is further utilized based on whether a match of statistical distribution is determined between the replacement image and the plurality of actual face images from the other humans.

6. The method of claim 1, wherein the data comprises video camera images of vehicles and humans along one or more roadways in which the vehicles travel.

7. The method of claim 1, further comprising:
   updating one or more datasets in computer memory using the updated frame for each of the one or more frames, generating one or more updated data sets.

8. The method of claim 7, further comprising:
   training one or more models for control of assisted and automated driving vehicles, using the one or more updated data sets.

9. The method of claim 1, wherein the identifying of the one or more regions of interest for privacy protection, the extracting of the high level properties, the generating of the replacement image, and the updating of the frame are performed via the one or more processors disposed on a vehicle in which the data is obtained.

10. The method of claim 1, wherein the identifying of the one or more regions of interest for privacy protection, the extracting of the high level properties, the generating of the replacement image, and the updating of the frame are performed via the one or more processors disposed on one or more roadway infrastructure systems in which the data is obtained.

11. A system comprising:
    one or more cameras configured to obtain data including one or more frames; and
    one or more processors that are coupled to the one or more cameras and that are configured to at least facilitate:
       identifying, for each frame of the one or more frames, one or more regions of interest for privacy protection, the one or more regions of interest pertain to a face of a human;
       extracting, for each region of interest of the one or more regions of interest, high level properties of the region of interest for the frame;
       generating a replacement image for each of the one or more regions of interest, thereby protecting privacy while maintaining the high level properties of the region of interest, the replacement image comprising a synthetic human face image having the high level properties of the face of the human;
       comparing the replacement image with a plurality of actual face images from other humans; and
       for each of the one or more frames, updating the frame utilizing the replacement image for each of the one or more regions of interest, generating an updated frame that protects individual privacy, utilizing the replacement image only when a match of statistical distribution is determined between the replacement image and the plurality of actual face images from the other humans.

12. The system of claim 11, wherein:
    the one or more regions of interest further pertain to a license plate of a vehicle; and
    the replacement image further comprises a synthetic license plate image having the high level properties of the license plate.

13. The system of claim 12, wherein the one or more processors are further configured to at least facilitate:
    comparing the replacement image with a plurality of actual license plate images from other vehicles; and
    utilizing the replacement image further based on whether a match of statistical distribution is determined between the replacement image and the plurality of actual license plate images from the other vehicles.

14. The system of claim 11, wherein:
the one or more cameras are configured to obtain the data comprising video camera images of vehicles and humans along one or more roadways in which the vehicles travel; and
the one or more processors are further configured to at least facilitate:
  updating one or more datasets in computer memory using the updated frame for each of the one or more frames, generating one or more updated data sets; and
  training one or more models for control of assisted and automated driving vehicles, using the one or more updated data sets.

15. A system comprising:
one or more cameras configured to obtain observational data including one or more frames as to a plurality of actors, including vehicles and humans, along one or more roadways in which the vehicles travel; and
one or more processors that are coupled to the one or more cameras and that are configured to at least facilitate:
  identifying, for each frame of the one or more frames, one or more regions of interest for privacy protection pertaining to the vehicles and the humans, the one or more regions of interest pertaining to a license plate of a vehicle;
  extracting, for each region of interest of the one or more regions of interest, high level properties of the region of interest for the frame;
  generating a synthetic replacement image for each of the one or more regions of interest, thereby protecting privacy while maintaining the high level properties of the region of interest, the replacement image comprising a synthetic license plate image having the high level properties of the license plate;
  comparing, via the one or more processors, the replacement image with a plurality of actual license plate images from other vehicles;
  for each of the one or more frames, updating the frame utilizing the synthetic replacement image for each of the one or more regions of interest, generating an updated frame that protects individual privacy, wherein the replacement image is utilized only when a match of statistical distribution is determined between the replacement image and the plurality of actual license plate images from the other vehicles;
  updating one or more datasets in computer memory using the updated frame for each of the one or more frames, generating one or more updated data sets; and
  training one or more models for control of assisted and automated driving vehicles, using the one or more updated data sets.

16. The system of claim 15, wherein the synthetic license plate image has a font, color, style, and jurisdiction in common with the license plate, but includes a different license plate number.

17. The system of claim 16, wherein:
the one or more regions of interest further pertain to a face of a human; and
the replacement image further comprises a synthetic human face image having the high level properties of the face of the human.

18. The system of claim 17, wherein the synthetic human face image has an age, race, size, and in common with the face of the human, but for which the human is not recognizable from the synthetic human face image.

19. The system of claim 17, wherein the one or more processors are further configured to at least facilitate:
  comparing the replacement image with a plurality of actual face images from other humans;
  utilizing the replacement further based on whether a match of statistical distribution is determined between the replacement image and the plurality of actual face images from the other humans.

20. The system of claim 15, wherein the identifying of the one or more regions of interest for privacy protection, the extracting of the high level properties, the generating of the replacement image, and the updating of the frame are performed via the one or more processors disposed on a vehicle in which the data is obtained.

* * * * *